United States Patent [19]
Horimai

[11] Patent Number: 5,903,533
[45] Date of Patent: *May 11, 1999

[54] DISC HAVING AT LEAST ONE SERVO AREA PIT FORMED OUT OF PHASE FOR SERVO AREA IDENTIFICATION

[75] Inventor: Hideyoshi Horimai, Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/927,446

[22] Filed: Sep. 11, 1997

Related U.S. Application Data

[63] Continuation of application No. 08/786,982, Jan. 24, 1997, Pat. No. 5,729,523, which is a continuation of application No. 08/623,056, Mar. 28, 1996, Pat. No. 5,680,381, which is a continuation-in-part of application No. 08/430,183, Apr. 27, 1995, abandoned, which is a continuation-in-part of application No. 08/118,635, Sep. 10, 1993, abandoned.

[30] Foreign Application Priority Data

Sep. 11, 1992 [JP] Japan .................................... 4-269234

[51] Int. Cl.⁶ ...................................................... G11B 7/00
[52] U.S. Cl. ............................................... 369/59; 369/48
[58] Field of Search .......................... 369/275.1, 275.2, 369/275.3, 275.4, 44.26, 44.13, 54, 48, 59

[56] References Cited

U.S. PATENT DOCUMENTS

| | | |
|---|---|---|
| 4,843,601 | 6/1989 | Eguchi et al. . |
| 4,996,682 | 2/1991 | Yanagihara . |
| 5,020,046 | 5/1991 | Ueda . |
| 5,021,894 | 6/1991 | Naito et al. . |
| 5,063,545 | 11/1991 | Nishida . |
| 5,070,492 | 12/1991 | Ogawa et al. . |
| 5,073,880 | 12/1991 | Maeda et al. . |
| 5,120,136 | 6/1992 | Oakley . |
| 5,193,081 | 3/1993 | Ozawa et al. . |
| 5,278,814 | 1/1994 | Deguchi et al. . |
| 5,353,277 | 10/1994 | Yasuda et al. . |
| 5,388,090 | 2/1995 | Hoshino et al. . |

FOREIGN PATENT DOCUMENTS

| | | |
|---|---|---|
| A-0 278 006 | 8/1988 | European Pat. Off. . |
| A-0 430 042 | 6/1991 | European Pat. Off. . |
| 4-205719 | 7/1992 | Japan . |

OTHER PUBLICATIONS

Patent Abstracts of Japan, vol. 16, No. 121 (P–1329), Mar. 26, 1992 and JP–A–03 288 337 (Matsushita Electric Ind. Co. Ltd.).

Patent Abstracts of Japan, vol. 14, No. 561 (P–1142), Dec. 13, 1990 & JP–A–02 240 870 (Mitsubishi Electric Corp.).

Patent Abstracts of Japan, vol. 16, No. 547 (P–1452), Nov. 17, 1992 & JP–A–04 205 719 (Ricoh Co. Ltd.), Jul. 27, 1992.

*Primary Examiner*—Nabil Hindi
*Attorney, Agent, or Firm*—Hill & Simpson

[57] ABSTRACT

A recording medium such as an optical or magneto-optical disk divided into servo areas and data areas, wherein at least one of pits in each servo area is formed with a phase deviation. There are also disclosed a method of recording pits on such a recording medium, and an apparatus for recording data on and/or reproducing the same from the recording medium. The apparatus comprises a light source for irradiating a light output to the recording medium; a photoelectric converter for receiving the light emitted from the light source and reflected from or transmitted through the recording medium, and converting the received light into an RF signal; a signal converter for converting the output RF signal of the photoelectric converter into a binary signal corresponding to the pit formed on the recording medium; and a detector for detecting the servo area on the recording medium on the basis of the phase deviation of the binary signal outputted from the signal conversion means; wherein data is recorded or reproduced while a servo action is executed in accordance with the servo byte in the servo area detected by teh detector.

2 Claims, 4 Drawing Sheets

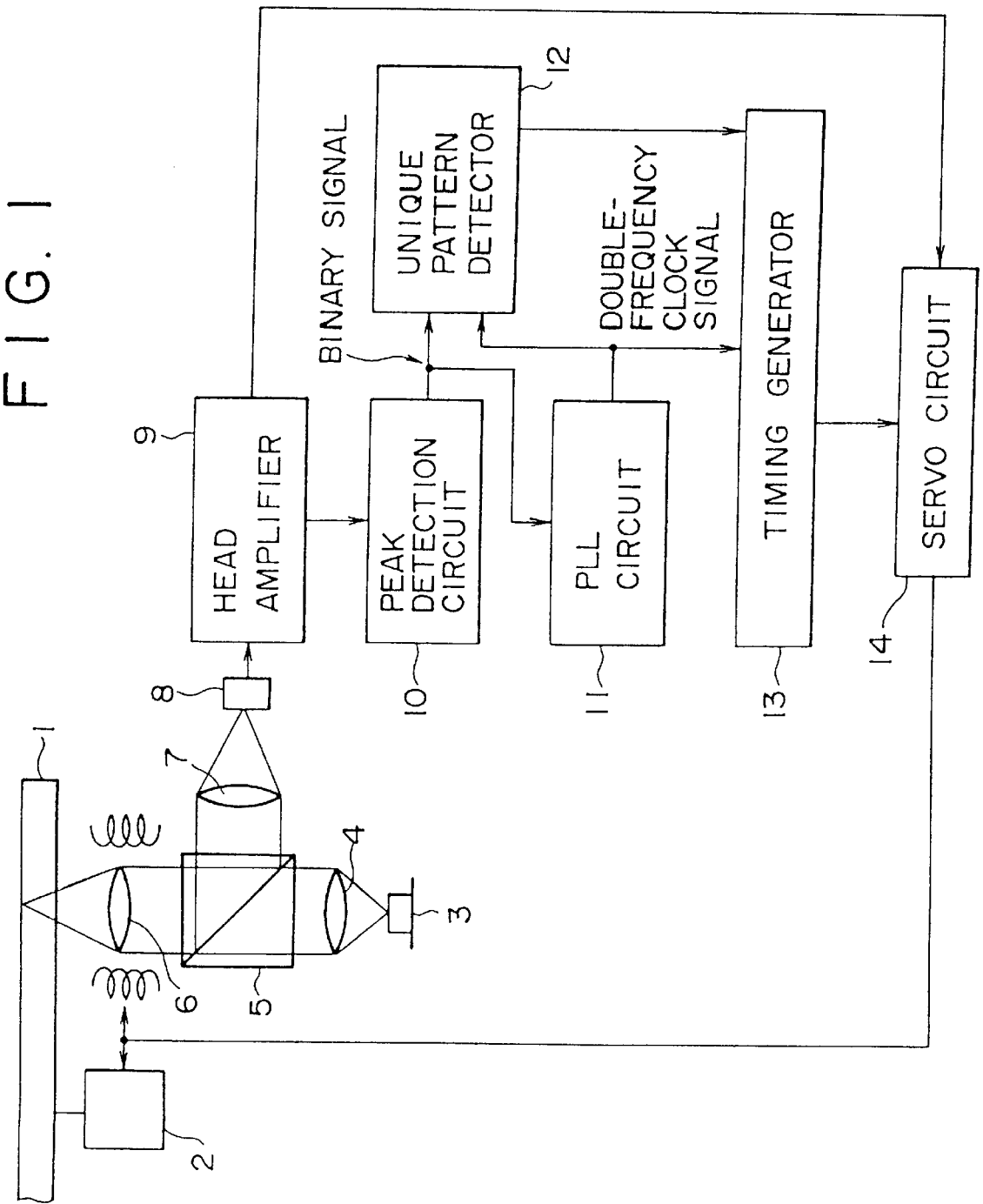

DISC HAVING AT LEAST ONE SERVO AREA PIT FORMED OUT OF PHASE FOR SERVO AREA IDENTIFICATION

RELATED APPLICATION DATA

This application is a Rule 60 continuation of U.S. application Ser. No. 08/786,982 filed Jan. 24, 1997, now U.S. Pat. No. 5,729,523 which is a Rule 60 continuation of U.S. application Ser. No. 08/623,056 filed Mar. 28, 1996, now U.S. Pat. No. 5,680,381 which is a Rule 62 cip of U.S. Ser. No. 08/430,183 filed Apr. 27, 1995, now abandoned, which is a cip of U.S. application Ser. No. 08/118,635 filed Sep. 10, 1993, now abandoned. The foregoing applications are incorporated herein by reference to the extent not already presented herein. The present and foregoing application claims priority to Japanese application No. P04-269234 dated Sep. 11, 1992.

BACKGROUND OF THE INVENTION

1. Field of the Invention

The present invention relates to a recording medium adapted for use as an optical disk, a magneto-optical disk or the like, and also to a method of recording data on such a recording medium, an apparatus for recording data on and/or reproducing the same from the recording medium, and further to an apparatus for cutting the recording medium.

2. Description of the Related Art

On an optical disk (ROM disk) or the like where tracking is executed by a sample servo system, a multiplicity of servo areas are formed at predetermined intervals on tracks together with data areas for recording ordinary data, wherein each of the servo areas includes wobbled pits for effecting a tracking servo action, a mirror portion for effecting a focus servo action, and a clock pit for generating a clock signal (for effecting a spindle servo action to a spindle motor for rotating the optical disk).

Meanwhile in an optical disk apparatus for reproducing the recorded data in the data areas on the optical disk, such servo areas (servo bytes) formed on the optical disk are detected and used for tracking or generation of a clock signal.

For the purpose of enabling the optical disk apparatus to exactly detect the servo area, it has been necessary heretofore to modulate the data, which is recorded in the data area on the optical disk mentioned above, in such a manner that the pit pattern thereof becomes different from the pit pattern of servo bytes composed of wobbled pits and clock pits in the servo area. More specifically, if nonmodulated data is recorded on the optical disk, there may arise a problem that the servo byte pattern in the servo area on the optical disk fails to become a unique pattern, whereby the servo area (servo byte) on the optical disk is rendered undetectable.

SUMMARY OF THE INVENTION

The present invention has been accomplished in view of the circumstances mentioned above. And its object is to provide an improvement which realizes proper detection of servo bytes with facility and is capable of recording and/or reproducing data of any pattern.

According to a first aspect of the present invention defined in the appended claim 1, there is provided a recording medium divided into servo areas and data areas, wherein at least one of pits in each servo area is formed with a phase deviation.

According to a second aspect of the present invention defined in the appended claim 6, there is provided a method of recording pits on a recording medium divided into servo areas and data areas. And its feature resides in forming at least one of the pits in each servo area with a phase deviation.

According to a third aspect of the present invention defined in the appended claim 7, there is provided a recording/reproducing apparatus which comprises a laser diode as a light source for irradiating its output light to a recording medium such as an optical disk where at least one of pits in each servo area is formed with a phase deviation; a light receiving element as a photoelectric conversion means for receiving the light emitted from the laser diode and reflected from or transmitted through the optical disk, and converting the received light into an RF signal; a peak detection circuit as a signal conversion means for converting the output RF signal of the light receiving element to a binary signal corresponding to the pit formed on the optical disk; and a unique pattern detector as a servo area detection means for detecting the servo area on the optical disk in response to the phase deviation of the binary signal outputted from the peak detection circuit; wherein the data is recorded and/or reproduced while a servo action is executed on the basis of the servo byte in the servo area detected by the unique pattern detector.

And according to a fourth aspect of the present invention defined in the appended claim 8, there is provided an apparatus for cutting a recording medium divided into servo areas and data areas, wherein at least one of pits in each servo area is formed with a phase deviation.

On the recording medium of the appended claim 1, at least one of the pits in each servo area is formed with a phase deviation, so that the servo area can be detected by detection of the phase deviation in the data reproduced from the recording medium. And it is possible to record data of any pit pattern on such recording medium.

In the recording method of the appended claim 6, at least one of the pits in each servo area is formed with a phase deviation on the recording medium. Therefore the servo area is rendered detectable by detecting such phase deviation of the data reproduced from the recording medium.

In the recording/reproducing apparatus of the appended claim 7, light is irradiated to a recording medium such as an optical disk where at least one of the pits in each servo area is formed with a phase deviation, and the light reflected from or transmitted through the recording medium is received and converted into an RF signal. Then such RF signal is further converted to a binary signal corresponding to the pit formed on the optical disk, and the servo area on the optical disk is detected on the basis of the phase deviation of the binary signal. And the data is recorded or reproduced while a servo action is executed in conformity with the servo byte in the detected servo area. Consequently the servo area is detectable with facility.

And in the cutting apparatus of the appended claim 8, at least one of the pits in each servo area is formed with a phase deviation on a recording medium such as an optical disk. Therefore it becomes possible to easily detect the servo area on such a recording medium.

The above and other features and advantages of the present invention will become apparent from the following description which will be given with reference to the illustrative accompanying drawings.

BRIEF DESCRIPTION OF THE DRAWINGS

FIG. 1 is a block diagram showing the constitution of an exemplary optical disk apparatus where the recording/reproducing apparatus of the present invention is applied;

DESCRIPTION OF THE PREFERRED EMBODIMENTS

FIG. 1 is a block diagram showing the constitution of an exemplary optical disk apparatus where the recording/reproducing apparatus of the present invention is applied. An optical disk 1 used therein consists of the recording medium of the present invention, on which each of tracks is composed of a plurality of sectors, and each sector is composed of a plurality of segments. Each segment is divided into a servo area having a servo byte (servo pits) and a data area for recording essential data. And at least one of the pits in each servo area is formed with a phase deviation of π for example.

Figures 2A, 2B, 2C, 2D, 2E, 2F, 2G, 2H:
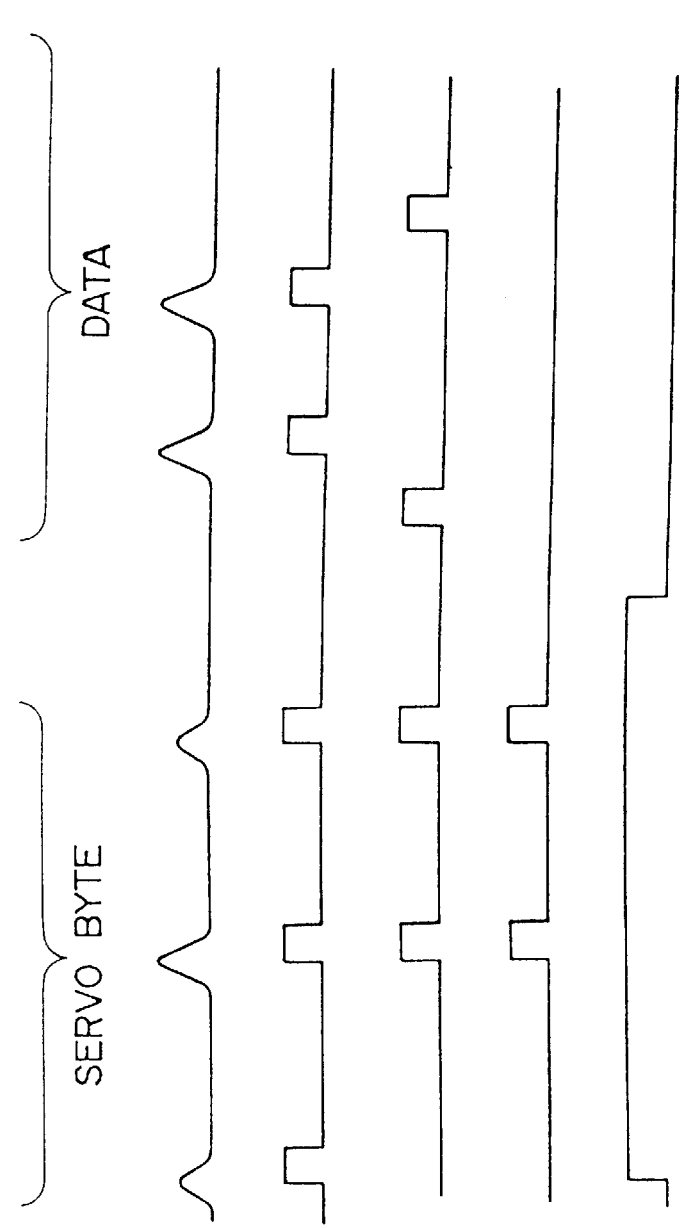
FIG. 2A–2H is a waveform chart of signals outputted respectively from the blocks of the apparatus shown in FIG. 1.

In an exemplary case of using a clock signal (FIG. 2(b)) of a period 2T, data is recorded, in one data area on the optical disk 1, at a position corresponding in timing to the rise edge of the clock pulse of the period 2T. Then, in a servo area relative thereto, as shown in FIG. 2(c), a clock pit in a servo byte composed of wobbled pits and such clock pit is formed at the position corresponding in timing to the fall edge of the clock pulse of the period 2T (FIG. 2(b)).

A spindle motor 2 rotates the optical disk 1 at a predetermined velocity in accordance with a spindle servo signal obtained from a servo circuit 14. A laser diode 3 is a light source for irradiating a laser light output to the optical disk 1. A collimator lens 4 serves to collimate the laser light beam emitted from the laser diode 3. And a beam splitter 5 causes the output light of the collimator lens 4 to be incident on an objective lens 5 while reflecting, by means of an incorporated half mirror, the light reflected from the optical disk 1 via the objective lens 6, thereby causing the reflected light to be incident on a condenser lens 7.

The objective lens 6 is driven in response to a tracking servo signal or a focus servo signal outputted from a servo circuit 14 and focuses, on the optical disk 1, the laser light irradiated thereto from the laser diode 3 via the collimator lens 4 and the beam splitter 5. Meanwhile the condenser lens 7 focuses, on the surface of the light receiving element 8, the light reflected from the optical disk 1 and incident on the condenser lens 7 via the objective lens 6 and the beam splitter 5.

The light receiving element 8 receives the reflected light from the optical disk 1 and transmits to a head amplifier 9 an output RF signal (FIG. 2(d)) equivalent to the amount of the received light. Then the head amplifier 9 amplifies the RF signal obtained from the light receiving element 8 and supplies the amplified signal to both a peak detection circuit 10 and a servo circuit 14.

The peak detection circuit 10 converts the RF signal (FIG. 2(d)) obtained from the light receiving element 8 via the head amplifier 9, to a binary signal (FIG. 2(e)) corresponding to the pit formed on the optical disk 1. More specifically, the peak detection circuit 10 detects the peak value of the RF signal (FIG. 2(d)) outputted from the light receiving element 8 via the head amplifier 9 and, after producing a pulse (FIG. 2(e)) corresponding to the detected peak value, supplies such pulse to both a PLL circuit 11 and a unique pattern detector 12.

The PLL circuit 11 produces a double-frequency clock signal (FIG. 2(a)) of a period T, which is half the recording period 2T relative to the data in the data area on the optical disk 1, out of the binary signal obtained from the peak detection circuit 10, and then supplies the double-frequency clock signal of the period T to both the unique pattern detector 12 and a timing generator 13.

Figure 3:
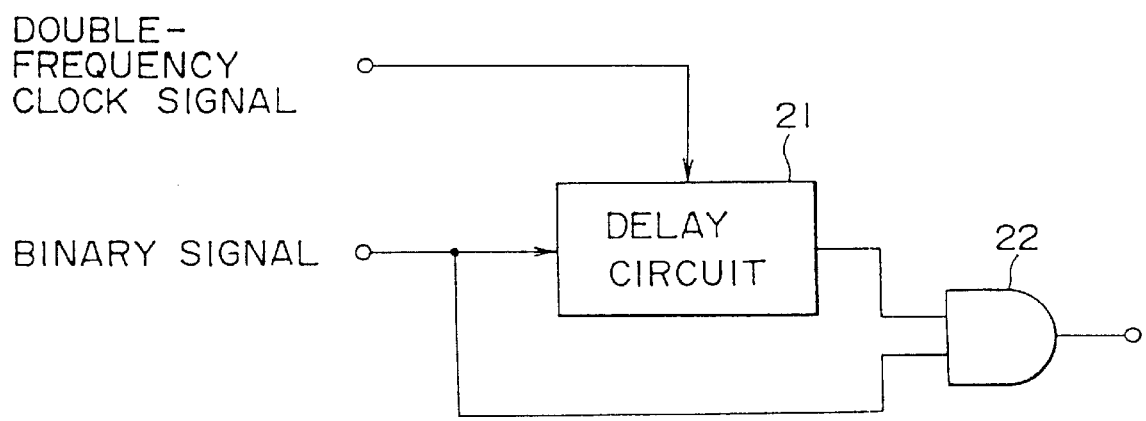
FIG. 3 is a detailed block diagram of a unique pattern detector employed in the apparatus of FIG. 1.

The unique pattern detector 12 comprises a delay circuit 21 and an AND gate 22 as shown in FIG. 3. The delay circuit 21 delays the output binary signal of the peak detection circuit 10 by a time length equivalent to an odd multiple of the period T of the double-frequency clock signal (FIG. 2(a)) supplied from the PLL circuit 11, and then feeds the delayed signal to one input terminal of the AND gate 22. More specifically, the delay circuit 21 delays the output binary signal of the peak detector 10 by a time length of (2n+1)T and feeds the delayed signal to one input terminal of the AND gate 22. In (2n+1)T mentioned above, n=0, 1, . . . and so forth; and n=1 in this embodiment. It follows therefore that the delay circuit 21 in this embodiment delays the binary signal by a time length of 3T. Although n may be set to any desired value, it is preferred that n be set in conformity with the period (interval) of the pits formed on the optical disk 1.

The AND gate 22 delivers a logic product of the binary signal supplied to its one input terminal from the delay circuit 21 with a delay of (2n+1)T and another binary signal supplied to the other input terminal from the peak detection circuit 10, and transmits a high-level or low-level output to the timing generator 13.

The servo circuit 14 receives the RF signal from the head amplifier 9 in response to a control signal (FIG. 2(h)) outputted from the timing generator 13, and transmits an output servo signal to the spindle motor 2 or the objective lens 6 in accordance with such RF signal (which corresponds to the servo area on the optical disk 1 as will be mentioned later).

Now the operation of the above apparatus will be described below. When the power supply is switched on for the apparatus, the spindle motor 2 rotates the optical disk 1 where the clock pit (FIG. 2(c)) out of the pits in the servo area is formed with a phase deviation π, and simultaneously a laser light output is irradiated from the laser diode 3 to the optical disk 1 via the collimator lens 4 and the beam splitter 5. The laser light irradiated to the optical disk 1 is reflected therefrom and then is incident on the surface of the light receiving element 8 via the objective lens 6, the beam splitter 5 and the condenser lens 7. Thus the reflected light from the optical disk 1 is received by the light receiving element 8, and an RF signal (FIG. 2(d)) equivalent to the amount of the received light is supplied via the head amplifier 9 to both the peak detection circuit 10 and the servo circuit 14.

In the peak detection circuit 10, the RF signal (FIG. 2(d)) outputted from the light receiving element 8 via the head amplifier 9 is converted to a binary signal (FIG. 2(e)) corresponding to the pit formed on the optical disk 1, and such binary signal is supplied to both the PLL circuit 11 and the unique pattern detector 12.

In the PLL circuit 11, a double-frequency clock signal (FIG. 2(a)) of a period T, which is half the recording period 2T relative to the data in the data area on the optical disk 1, is produced out of the binary signal (FIG. 2(e)) obtained from the peak detection circuit 10, and then such double-frequency clock signal is supplied to both the unique pattern detector 12 and the timing generator 13.

In the delay circuit 12 of the unique pattern detector 12, the binary signal outputted from the peak detection circuit 10 is delayed by a time length of, e.g., 3T which is an odd multiple of the period T of the double-frequency clock signal (FIG. 2(a)) supplied from the PLL circuit 11, and the delayed signal is fed to one input terminal of the AND gate 22. In the AND gate 22, there is delivered a logic product of the binary signal (FIG. 2(f)) supplied to its one input terminal from the delay circuit 21 with a delay of 3T and another binary signal (FIG. 2(e)) supplied to the other input terminal from the peak detection circuit 10, and then a high-level or low-level output (FIG. 2(g)) is transmitted to the timing generator 13.

In an exemplary case of using the clock signal (FIG. 2(b)) of a period 2T as described, data is recorded, in one data area on the optical disk 1, at a position corresponding in timing to the rise edge of the clock pulse of the period 2T. Then, in a servo area relative thereto, as shown in FIG. 2(c), a clock pit in a servo byte composed of wobbled pits and such clock pit is formed at the position corresponding in timing to the fall edge of the clock pulse of the period 2T (FIG. 2(b)).

More specifically, in the use of the double-frequency clock signal produced by the PLL circuit 11 and consisting of pulses C1, C2, C3, ... and so forth (FIG. 2(a)) of a period T which is half the recording period 2T relative to the data in the data area on the optical disk 1, the pit (FIG. 2(c)) in the data area is formed at the position corresponding to an odd pulse (e.g., C11 or C13 in FIG. 2) of the double-frequency clock signal. Then it follows that the clock pit (FIG. 2(c)) in the servo area is formed at the position corresponding to an even pulse (e.g., C4 in FIG. 2) of the double-frequency clock signal.

Consequently, in the AND gate 22 (FIG. 3) of the unique pattern detector 12, there is delivered a logic product of the binary signal (FIG. 2(e)) converted from the RF signal (FIG. 2(d)) and the binary signal (FIG. 2(f)) delayed by a time length of 3T in the delay circuit 21. Subsequently, as shown in FIG. 2(g), a high-level output is transmitted from the AND gate 22 to the timing generator 13 in synchronism with the pulses C4 and C7 of the double-frequency clock signal (FIG. 2(a)), i.e., in synchronism with reproduction of the RF signal corresponding to the reflected light from the vicinity of the servo byte formed on the optical disk 1.

The operation mentioned above is performed repeatedly until a high-level output is transmitted from the unique pattern detector 12 at the predetermined timing. Then, in the timing generator 13, a control signal (a window corresponding to the interval of the segments on the optical disk 1) (FIG. 2(h)) is outputted to the servo circuit 14 approximately at the above-described predetermined timing, i.e., in synchronism with reproduction of the RF signal corresponding to the reflected light from the vicinity of the servo byte formed on the optical disk 1, in such a manner as to receive the RF signal from the head amplifier 9.

The RF signal obtained from the head amplifier 9, i.e., the RF signal corresponding to the reflected light from the servo byte (servo area) formed on the optical disk 1, is inputted to the servo circuit 14 in response to a control signal (FIG. 2(h)) outputted from the timing generator 13, and a servo signal is transmitted from the servo circuit 14 to the spindle motor 2 or the objective lens 6 in accordance with such RF signal corresponding to the reflected light from the servo byte (servo area) on the optical disk 1.

Subsequently the spindle servo, tracking servo and focusing servo actions are executed and, in a play-back circuit (not shown), the data is reproduced from the RF signal outputted from the head amplifier 9.

As described above, first the RF signal is converted to a binary signal corresponding to the pit formed on the optical disk 1, and the servo byte on the optical disk 1 is detected on the basis of the phase deviation of the binary signal thus obtained, so that it becomes possible to detect the servo byte with facility even if data of any pit pattern such as non-modulated one is recorded on the optical disk 1.

The optical disk 1 mentioned above may be replaced with a magneto-optical disk and, if the apparatus shown in FIG. 1 is further equipped with a circuit for detecting an optical deflection, a magnetic head for applying a magnetic field, and a recording circuit for converting record data into light, then it can function as a magneto-optical disk apparatus for recording data on and/or reproducing the same from a magneto-optical disk.

Figure 4:
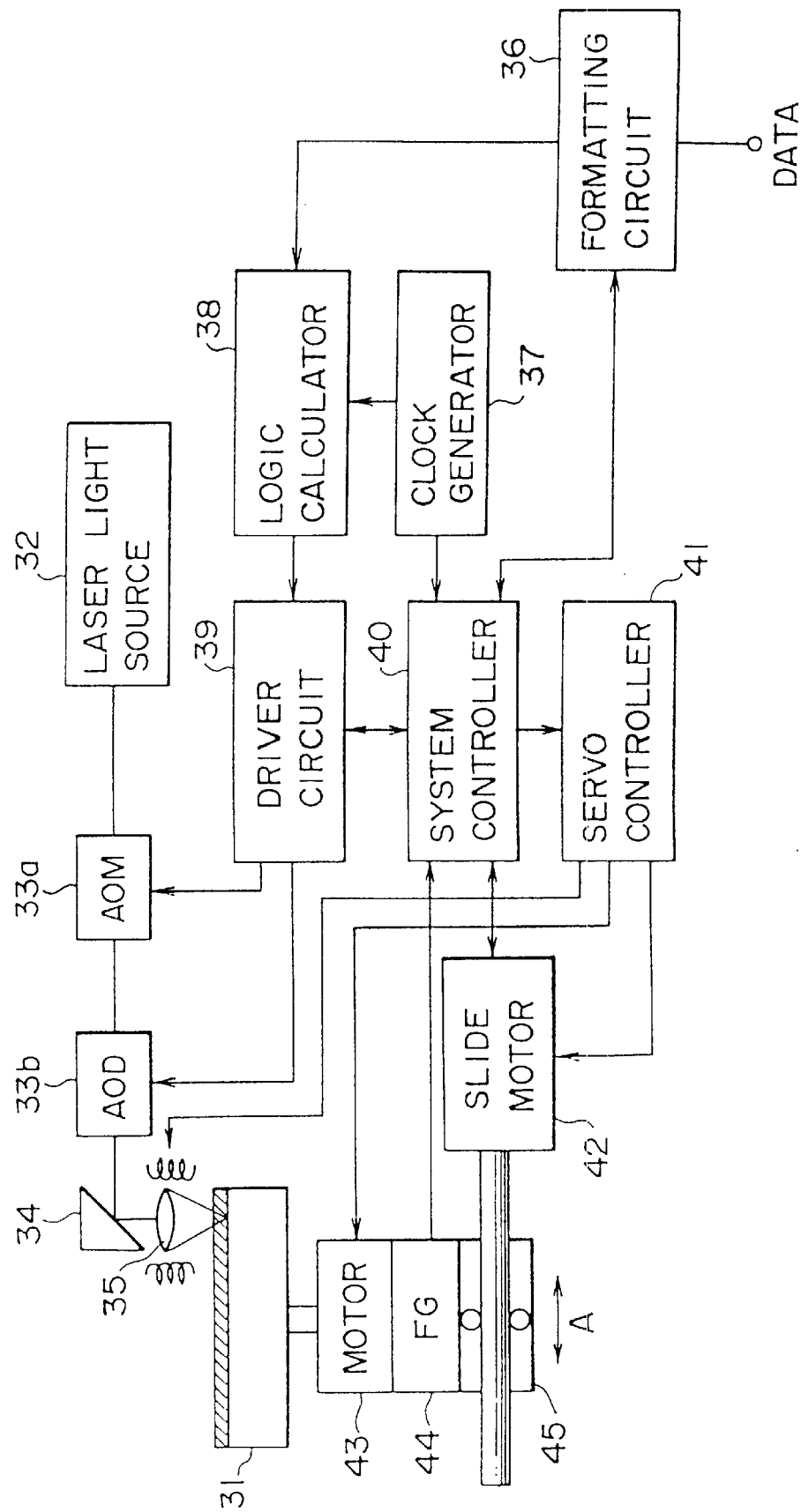
FIG. 4 is a block diagram of an exemplary embodiment representing the cutting apparatus of the present invention.

FIG. 4 is a block diagram showing the constitution of an exemplary embodiment which represents the cutting apparatus of the present invention. In this apparatus, a glass substrate 31 is coated with a photoresist (hatched in the drawing), and data is recorded by exposure of such photoresist to a laser light beam. A laser light source 32 irradiates its laser light output onto the glass substrate 31 via an acoustic optical modulator (AOM) 33a, an acoustic optical deflector (ACD) 33b, a prism 34 and an objective lens 35.

The AOM 33a is controlled by a driver circuit 39 and switches on or off the laser light emitted from the laser light source 32. More specifically, the AOM 33a passes or intercepts the light being emitted from the laser light source 32 to the glass substrate 31 via the AOD 33b, the prism 34 and the objective lens 35. The AOD 33b deflects the laser light, which is irradiated from the laser light source 32 via the AOM 33a, in accordance with control of the driver circuit 39. The prism 34 reflects, toward the objective lens 35, the laser light irradiated from the laser light source 32 via the AOM 33a and the AOD 33b. And the objective lens 35 is controlled by a servo controller 41 and focuses the laser light, which is reflected by the prism 34, onto the photoresist surface of the glass substrate 31.

Similarly to the aforementioned PLL circuit 11 in the optical disk apparatus of FIG. 1, a clock generator 37 generates a double-frequency clock signal (FIG. 2(a)) of a period T and supplies the clock signal to both a logic calculator 38 and a system controller 40. The system controller 40 controls a formatting circuit 36, the driver circuit 39, the servo controller 41 or a slide motor 42 in response to the double-frequency clock signal obtained from the clock generator 37. And the servo controller 41 rotates the motor 43 at a predetermined constant angular velocity in accordance with control of the system controller 40 while rotating the slide motor 42 to slide the glass substrate 31 in its radial direction (e.g., the direction indicated by an arrow A in the drawing). A frequency generator (FG) 44 generates FG pulses for detecting the rotation velocity of the motor 43 and supplies such pulses to the system controller 40.

The system controller 40 controls the servo controller 41, which controls the rotation of the motor 43, in response to the FG pulses obtained from the FG 44.

The motor 43 is controlled by the servo controller 41 to rotate the glass substrate 31 at a predetermined constant angular velocity. And a mechanical unit 45 is driven by the slide motor 42 to slide the glass substrate 31 in its radial direction.

The formatting circuit 36 executes a process of adding an error correction code or the like to the source data inputted thereto, and then supplies the processed data to the logic calculator 38. The logic calculator 38 incorporates a memory (not shown) of a required capacity and temporarily stores therein the data outputted from the formatting circuit 36. The logic calculator 38 further executes a predetermined logic calculation of the data stored temporarily in the incorporated memory in response to the double-frequency clock signal obtained from the clock generator 37, thereby producing record data. The record data thus produced in the logic calculator 38 is supplied to the driver circuit 39, which then controls the acoustic optical modulator (AOM) 33a or the acoustic optical deflector (AOD) 33b on the basis of such record data.

In the cutting apparatus mentioned, first the servo controller 41 supplies a control signal to the motor 43 for rotating the glass substrate 31 at a predetermined constant angular velocity, and also supplies another control signal to the slide motor 42 for driving the mechanical unit 45 so as to slide the glass substrate 31 in its radial direction.

The glass substrate 31 is rotated by the motor 43 at a predetermined constant angular velocity in accordance with the control signal obtained from the servo controller 41, and simultaneously the mechanical unit 45 is driven by the slide motor 42 so that the glass substrate 31 is slid at a predetermined pitch in its radial direction per rotation thereof by the motor 43.

The predetermined pitch is equivalent to the track pitch on the optical disk to be manufactured by the use of such glass substrate 31.

Simultaneously laser light is emitted from the laser light source 32 and then is irradiated to the photoresist surface of the glass substrate 31 via the AOM 33a, the AOD 33b, the prism 34 and the objective lens 35, whereby the photoresist surface is exposed.

Meanwhile in the formatting circuit 36, a process of adding an error correction code or the like to the input source data is executed, and the processed data is outputted to the logic calculator 38. Subsequently the data outputted from the formatting circuit 36 is temporarily stored in the memory incorporated in the logic calculator 38, where a predetermined logic calculation is executed for the stored data to thereby produce record data. And in the driver circuit 39, the AOM 33a or the AOD 33b is controlled, in response to the double-frequency clock signal (FIG. 2(a)) supplied from the clock generator 37 via the system controller 40, on the basis of the record data produced in the logic calculator 38.

When the record data corresponds to, for example, the pit in the data area formed on the optical disk 1 to be reproduced by the optical disk apparatus of FIG. 1, the AOM 33a is so controlled by the driver circuit 39 as to switch on or off the laser light being irradiated from the laser source 32, on the basis of such record data in synchronism with, e.g., an odd pulse out of the entire odd pulses (C1, C3, . . .) and even pulses (C2, C4, . . .) of the double-frequency clock signal (FIG. 2(a)) outputted from the clock generator 37. In this case, the AOM 33a is so controlled as to switch off the laser light being irradiated from the laser source 32, in synchronism with the even pulse of the double-frequency clock signal (FIG. 2(a)) outputted from the clock generator 37.

In case the record data thus produced corresponds to the wobbled pit (FIG. 2(c)) in the servo byte formed on the optical disk 1 (FIG. 1), the driver circuit 39 controls the AOM 33a in such a manner as to switch on the laser light being irradiated from the laser light source 32, in synchronism with, e.g., an odd pulse (C1 or C7 in FIG. 2) out of the entire odd and even pulses of the double-frequency clock signal (FIG. 2(a)) outputted from the clock generator 37. And simultaneously the AOD 33b is so controlled as to deflect the laser light irradiated from the laser light source via the AOM 33a.

Consequently, an exposed portion corresponding to the wobbled pit (FIG. 2(c)) is formed on the glass substrate 31 in synchronism with the odd pulse of the double-frequency clock signal (FIG. 2(a)) outputted from the clock generator 37, with a radial deviation of a predetermined distance from the tracking center in the servo byte on the optical disk 1.

In another case where the record data corresponds to the clock pit (FIG. 2(c)) in the servo byte formed on the optical disk 1 (FIG. 1), the driver circuit 39 controls the AOM 33a in such a manner as to switch on the laser light being irradiated from the laser light source 32, in synchronism with, e.g., the even pulse (C4 in FIG. 2) out of the entire odd and even pulses of the double-frequency clock signal (FIG. 2(a)) outputted from the clock generator 37.

Consequently, an exposed portion corresponding to the clock pit (FIG. 2(c)) in the servo byte on the optical disk 1 is formed on the glass substrate 31 in synchronism with the even pulse of the double-frequency clock signal (FIG. 2(a)) outputted from the clock generator 37.

Thus an exposed portion corresponding to the clock pit, which is at least one of the pits in the servo area, is formed on the glass substrate 31 with a phase deviation of $\pi$ (180°).

Thereafter required processes such as developing and electroforming are executed for the glass substrate 31 where the exposed and nonexposed portions are formed as described, so that a metallic stamper is manufactured. And a multiplicity of the optical disks 1 mentioned above are mass-produced by the use of such a stamper.

Although a description has been given hereinabove with regard to an exemplary case of using an optical disk, it is to be understood that the recording medium of the present invention is not limited to the optical disk alone, and the invention is applicable also to any other optical recording medium such as a magneto-optical disk.

In the embodiments mentioned, merely the clock pit out of the entire pits in each servo area is formed with a phase deviation on the optical disk 1. However, any other pit such as a wobbled pit in the servo area may be formed with a phase deviation on the optical disk 1. And the number of the phase-deviated pits on the optical disk 1 is not limited to any particular value alone.

It is further to be understood that, although the phase of one pit (clock pit in the embodiment) in the servo area is deviated by $\pi$, the phase deviation of the pit is not limited merely to $\pi$ alone.

As described hereinabove, according to the recording medium of the present invention where at least one of the pits in each servo area is formed with a phase deviation, the servo area can be detected by detecting the phase deviation of the data reproduced from the recording medium. And data of any pit pattern is rendered recordable on the recording medium.

According to the recording method of the invention which forms at least one of the pits in each servo area with a phase deviation, it becomes possible to detect the servo area by detecting the phase deviation of the data reproduced from the recording medium.

According to the recording/reproducing apparatus of the invention, light is irradiated to the recording medium where at least one of the pits in each servo area is formed with a phase deviation, and the light reflected from or transmitted through the recording medium is received and converted into an RF signal. Thereafter the RF signal thus obtained is further converted to a binary signal corresponding to the pit formed on the recording medium, and the servo area on the recording medium is detected on the basis of the phase deviation of the binary signal, and data is recorded or reproduced while a servo action is executed in accordance with the servo byte in the detected servo area, whereby the servo area is detectable with facility.

And further according to the cutting apparatus of the invention, at least one of the pits in each servo area is formed with a phase deviation on the recording medium. Consequently it becomes possible to easily detect the servo area from the recording medium.

What is claimed is:

1. A recording/reproducing apparatus comprising:

a light source for irradiating a light output to a recording medium including a recording track having a data area having data pits formed therein at a predetermined clock frequency having a period 2T, and a servo area, said servo area having a clock pit and wobble pit longitudinally arranged substantially collinearly along a centerline of the recording track, each servo area has a phase deviation π formed between said clock pit and said wobble pits and one of said clock pit and said wobble pits is in phase with said data pits to enable detection of said servo area;

a photoelectric conversion means for receiving the light emitted from said light source and reflected from or transmitted through said recording medium, and converting the received light into an RF signal;

a signal conversion means for converting the output RF signal of said photoelectric conversion means into a binary signal corresponding to said plurality of pits and said data formed on said recording medium; and a detection means for detecting the phase deviation of the binary signal outputted from said signal conversion means to detect said servo area on said recording medium, said detection means performing a comparison of said binary signal and a delayed version of said binary signal to generate a signal wherein a wobble pit and a clock pit are matched, said delay being (2n+1)T, with n=0, 1, 2, etc. during an interval in which said servo area is being read;

wherein data is recorded or reproduced while a servo action is executed in accordance with the plurality of pits in the servo area detected by said detection means.

2. The recording/reproducing apparatus according to claim 1, wherein said wobble pits are formed in phase with said predetermined clock frequency and said clock pit is formed with said phase deviation π between said clock pit and said predetermined clock frequency.

* * * * *